Oct. 25, 1932.   G. S. LANE   1,883,981
CLUTCH OR BRAKE MECHANISM
Filed April 4, 1930
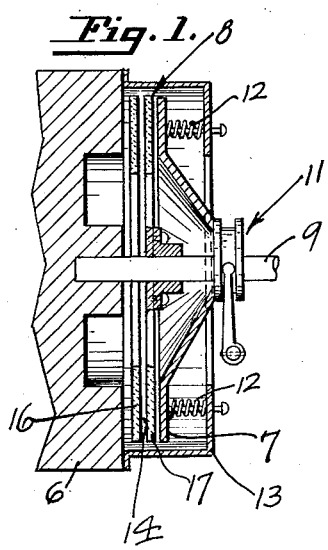
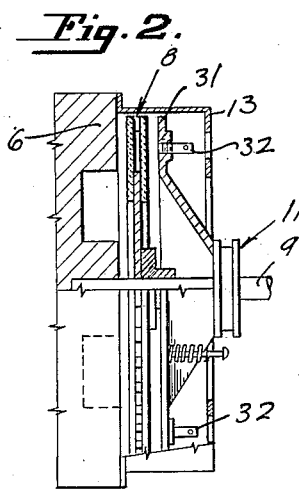
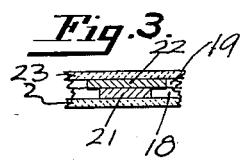
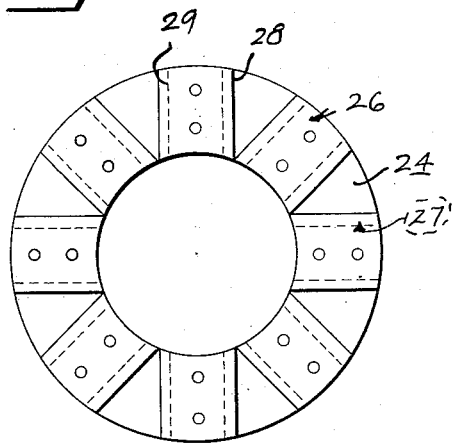
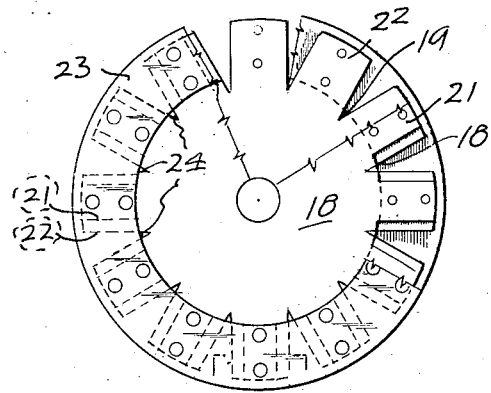
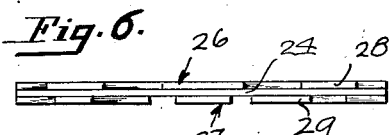
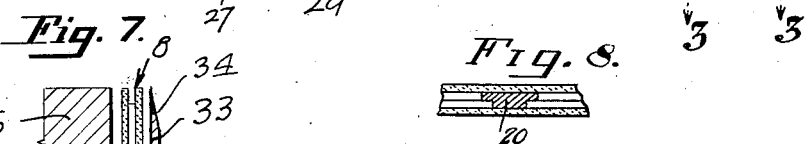
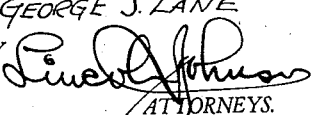
INVENTOR.
GEORGE S. LANE
BY
ATTORNEYS.

Patented Oct. 25, 1932

1,883,981

UNITED STATES PATENT OFFICE

GEORGE S. LANE, OF SAN ANSELMO, CALIFORNIA, ASSIGNOR TO RAYBESTOS-MANHATTAN, INC., OF BRIDGEPORT, CONNECTICUT, A CORPORATION OF NEW JERSEY

CLUTCH OR BRAKE MECHANISM

Application filed April 4, 1930. Serial No. 441,508.

This invention relates to disc clutches and the like.

It is the primary object of the invention to provide a driven element between the driving members of a disc clutch, and to provide means to generate less frictional capacity on one face of the driven element than on the other face thereof so as to compensate for the differing wear on the faces of the driven element adjacent to the different driving members.

Particularly it is the object of the invention to provide a friction disc between a fly wheel and a pressure plate of a disc clutch, and to arrange these elements in such a manner that the friction generated by the pressure plate is less than the friction generated by the fly wheel, thereby to compensate for the excessive heating and wear on the face of the disc adjacent the pressure plate and to equalize the wear on both faces of the disc, without reducing the effectiveness of the clutch.

Other objects and advantages are to provide disc clutches and the like that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawing, wherein

Fig. 1 is a somewhat diagrammatic sectional view of a clutch embodying the features of my invention.

Fig. 2 is a sectional view of the clutch showing means thereon to lubricate the friction face of the pressure plate.

Fig. 3 is a sectional view of a mat disc, with full facings on each side thereof, the mat disc being constructed to correct the pressures on the opposite facings of the disc, the section being taken on the line 3—3 of Fig. 4.

Fig. 4 is a face view of the pressure-corrected mat disc, part of the facing being broken away.

Fig. 5 is a face view of a friction disc, the friction facings of which are corrected to offer different rubbing area on the opposite sides of the disc.

Fig. 6 is an end view of the disc shown in Fig. 5.

Fig. 7 is a fragmental, sectional view of a clutch mechanism including a corrected pressure plate.

Fig. 8 is a fragmental sectional view of a mat disc with full facings on each side thereof, the mat disc being constructed to correct the pressures on the opposite facings of the disc.

This application is a continuation in part of the following copending applications for disc clutches and the like, Serial No. 377,314, filed July 10, 1929; Serial No. 404,689, filed November 4, 1929; Serial No. 404,690, filed November 4, 1929; Serial No. 410,972, filed December 2, 1929; Serial No. 410,973, filed December 2, 1929; and Serial No. 426,869 filed February 8, 1930.

By the devices described in my copending applications, I endeavored to correct the unequal wear of the friction disc of a clutch by a correction of either the area of rubbing surface throughout a facing, or by correcting the disc to equalize the pressure resistance throughout a facing. I have found that by the corrections described in the above mentioned copending applications, the wear on the facing is equally distributed, and "chatter" and "whine" are entirely eliminated.

In practical use the friction disc of a clutch of this type is disposed between a fly wheel and a pressure plate to be frictionally engaged by both at will. The fly wheel is a better heat reservoir than the usual pressure plate, therefore it takes a longer period to heat the fly wheel than the comparatively thin pressure plate. Consequently the frictional heat developed on the facing on the pressure plate side of the disc is much higher than the frictional heat on the fly wheel side of the disc. In the usual construction of disc clutches, the disc facing on the pressure plate side deteriorates and wears, in some instances, twice as fast as the facing on the fly wheel side. The usual way to equalize the wear on both sides of the disc is to use heavy pressure plates.

In order to effect the equalization of frictional heat and wear on both facings of a disc, yet allowing the use of light and thin pressure plates, it is necessary to reduce the frictional heat generated on the pressure plate side of the disc.

The friction generated between two surfaces depends directly on the area of the rubbing surface, on the pressure exerted thereon, and on the frictional coefficient of the contacting elements. Hence the correction of the generated friction can be effected by reducing the area of rubbing surface, or by correcting the pressure on the rubbing surface of the facing, or by using a facing of lower coefficient of friction, or using a pressure plate having lower coefficient of friction than the fly wheel, and finally by suitably lubricating the contacting, rubbing surfaces of the pressure plate and the adjacent facing. An embodiment of each of the aforementioned solutions of this problem is illustrated in the drawing, and is fully described herein.

It is to be noted that all the solutions of the problem of equalization of wear on both facings of a disc, are accomplished by reducing the friction-generated heat on the pressure plate side of the disc to compensate for the better heat absorbing qualities of the fly wheel, yet permitting the use of light and thin pressure plates in the disc clutch.

In carrying out my invention I make use of a fly wheel 6, and a pressure plate 7, mounted in operative relation to each other in any customary manner. Between the fly wheel 6 and the plate 7 is positioned a friction mat disc 8 mounted on a driven shaft 9. The pressure plate 7 is controlled by a suitable clutch releasing and engaging mechanism 11 and coil springs 12 to urge the plate 7 toward the disc 8. The entire clutch mechanism is inclosed in a casing shown somewhat diagrammatically at 13. The fly wheel 6 and the plate 7 form the driving members of the disc clutch and the disc 8 is the driven member transferring rotation to the shaft 9.

The first method of equalizing the friction on both sides of the disc 8 is to construct the same of a mat plate 14 with a facing 16 on the fly wheel side thereof and with a facing 17 on the pressure plate side thereof. The facing 17 is made of a material having a lower coefficient of friction than that of the facing 16. The difference between the coefficients of friction of the facings 16 and 17 is such as to result in equal friction on both facings under the same pressure conditions.

The second method of equalizing the friction capacity on both sides of the disc is to have the facings 16 and 17 of the same coefficient of friction, but to construct the pressure plate 7 out of a material having a suitable lower coefficient of friction than that of the fly wheel.

In both methods of equalization the mat plate 14, and the facings 16 and 17 are to be corrected in accordance with the circumferential pressure or area corrections described in my said copending applications, to eliminate chatter and whine.

The corrections of the disc or facing can be so arranged as to create the compensating difference of friction capacity on the opposite facings. In Figs. 3 and 4, I show an embodiment of the pressure correction principle, in which the pressure is equalized on the circumferential rubbing surfaces of the facing, the corrections on the opposite facings being slightly different to create more friction on one facing than on the other facing. The pressure correction itself is described in detail in my said application, Serial No. 426,869. In this embodiment two parallel discs 18 and 19 are secured to each other, face to face. The discs 18 and 19 have outwardly extending radial fingers 21 and 22, respectively thereon, and the respective fingers 21 and 22 overlie each other. The fingers 18 are narrower than the fingers 19 so as to leave larger spacings between the fingers 18 than between the fingers 19. On the outside of each disc 18 and 19 is placed a friction disc ring 23 so that the outer peripheries of the rings 23 extend beyond the outer peripheries of the discs 18 and 19, and the inner peripheries of the friction rings 23 leave the corners 24 of the wedge shaped spacings between the fingers 21 and 22 uncovered, so that air currents can pass through the spacings or slots between the respective fingers. The more area that is cut away from the discs the larger is the unsupported or unbacked area of the respective friction ring and the less resistance it offers to pressure exerted thereon. Consequently, when the entire mat is under pressure, the friction developed on the facing 23 of the disc 18 is less than the friction generated on the other facing. In this manner, not only the circumferential rubbing surfaces are equalized but also the total effective rubbing surface on the side of the disc 18 is made less than on the side of the disc 19, thereby achieving the difference in friction capacity on the opposite sides of the entire mat. It is preferable that the disc 18 be disposed opposite the pressure plate. Any other pressure correction may be similarly differentiated on the opposite faces of a disc to accomplish the said arrangement of total friction areas. The aforedescribed result may be accomplished by the use of a single disc 20 by cutting the slots or spaces between the radial fingers of the disc 20 so that the faces of the single fingers on one side are wider than on the other side as shown in Fig. 8.

In the embodiment shown in Figs. 5 and 6, my method of producing different friction capacities on opposite sides of clutch mats is accomplished by the different correction of the rubbing area on the opposite faces of the mat. On the opposite sides of the mat disc 24 are facings 26 and 27. At least one of the facings is to be corrected by cutting away or rendering inactive a portion thereof. If the other facing is a full circle facing, its frictional capacity is larger than that of the corrected facing. In this illustration both facings 26 and 27 are corrected, by using radial segments 28 and 29 respectively. The segments 29 are narrower than the segments 28 so that the friction capacity of the facing 27 is less than that of the facing 28.

The friction capacity of the pressure plate itself can be reduced by suitable lubrication of its face, as illustrated in Fig. 2, wherein a pressure plate 31 has lubricant containing elements, such as grease fittings 32 thereon. The fittings 32 are shown merely for the purpose of illustration, because suitable lubrication of the pressure plate side of the disc 8, may be achieved in various other ways.

In Fig. 7 I show a pressure plate 33 in a clutch, which plate is tapered toward its outer periphery as at 34, whereby less pressure is created at the outer periphery of the mat than nearer to the center thereof. In this manner the pressure plate action is equalized and the same may be used in connection with either corrected or full circle facings, which are constructed to have a desired friction capacity.

The face of the fly wheel or of the pressure plate may be corrected for different frictional capacities, in the manner described in my copending applications, by slotting or cutting away the said faces, or providing suitable facings thereon.

It will be recognized that in all the embodiments of my invention the principle of different friction capacities on the opposite sides of the clutch mat is effectively carried out to equalize the wear on the opposite facings of the mat, regardless of the relative thickness and heat absorbing qualities of the opposed pressure surface acting on the mat.

Having thus described this invention, what I claim and desire to secure by Letters Patent is:

1. In a device of the character described, two opposed plane pressure surfaces, a friction disc between said surfaces adapted to be engaged by both pressure surfaces; and means to generate friction between each pressure surface and the adjacent face of the said disc, so that the friction generated on one face of said disc is less than the friction generated on the other side of the said disc.

2. In a device of the character described, a pair of opposed plane pressure surfaces, a friction disc between said surfaces adapted to be engaged on the opposite faces thereof by the said surfaces, and means to lessen the frictional contact between one of the faces of the friction disc and the adjacent pressure surface.

3. In a clutch mechanism, a friction member having two plane friction faces thereon; a pressure surface opposite each face of the said member adapted to frictionally engage the same so that the friction generated on one face of the friction member is less than the friction generated on the other face thereof.

4. In a clutch mechanism of the disc clutch type the combination of a driven member having substantially parallel plane faces and a facing on each face of the driven member, the facing on one side of the driven member being of a material of a lower coefficient of friction than the facing on the other side.

5. In a clutch mechanism of the disc clutch type, a friction engagement element between two pressure surfaces comprising a disc and a facing on each side of the disc, the facing on one side having lower coefficient of friction than the facing on the other side.

6. In a clutch mechanism of the disc clutch type, a mat disc and friction facing on each face thereof, the facing on one side of the disc having lower coefficient of friction than the facing on the other side thereof.

7. In a clutch mechanism, a fly wheel, and a pressure plate forming the driving members of the clutch, and a driven element adapted to be pressed between the flywheel and the pressure plate, said driven element having friction facing on each face thereof, the facing adjacent the pressure plate having lower coefficient of friction than the facing adjacent the fly wheel.

8. In a disc clutch, a friction element, a pair of opposed pressure surfaces, one on each side of said element adapted to frictionally engage the respective faces of said element, one of said pressure surfaces having lower coefficient of friction than the other pressure surface.

9. In a clutch mechanism, a fly wheel and a pressure plate, said pressure plate forming the driving member of the clutch, and a driven element adapted to be pressed between the fly wheel and the pressure plate having a lower coefficient of friction than the fly wheel.

10. The combination with a clutch mechanism having a mat disc therein with friction facings on the disc, and corrections on the mat disc to decrease the pressure resistance of said mat disc substantially in proportion to the increase of circumferential rubbing surface of the friction facings thereon from the inner and toward the outer periphery thereof, of a pair of opposed pressure surfaces one opposite each face of the mat disc adapted to frictionally engage the facings on the disc, one of said pressure surfaces having lower coefficient of friction than the other pressure surface.

11. The combination with a clutch mechanism having a mat disc therein with friction facings thereon, portions of the facings being rendered frictionally inactive to correct the circumferential frictional area at different radial distances, of a pair of opposed pressure plates adapted to be pressed against the opposite faces of the disc, one of the pressure plates having lower coefficient of friction than the other pressure plate.

12. In a device of the character described, a friction element, a pair of opposed pressure plates, one on each side of the said element adapted to frictionally engage the respective faces of said element, and means to lessen the frictional coefficient between one of the friction plates and one of the faces only of said element.

13. In a clutch mechanism, a fly wheel and a pressure plate forming the driving members of the clutch, a driven element adapted to be pressed between the fly wheel and the pressure plate by frictional engagement therewith, and means to lubricate the contacting surfaces of the pressure plate and said element to lessen the frictional contact on one face only of said element.

14. In a clutch mechanism, a fly wheel and a pressure plate forming the driving members of the clutch, a driven element adapted to be pressed between the fly wheel and the pressure plate by frictional engagement therewith; and means to lubricate the contacting surfaces of the pressure plate and said element to lessen the frictional contact thereat, the said element being corrected to substantially equalize the effective frictional contact at all radial distances on each face thereof.

15. In a clutch mechanism, a mat disc, a facing on each side thereof, pressure members on opposite sides thereof adapted to frictionally engage the respective facings of the mat disc; said disc being corrected to leave portions of said facings unsupported, thereby lessening the resistance thereof to the pressure exerted on the facings by the respective pressure members, the corrections being so arranged that the facing on one side offers less resistance to the pressure thereon than the facing on the other side of the disc.

16. In a clutch mechanism, a mat disc, a facing on each side thereof, pressure members on opposite sides thereof adapted to frictionally engage the respective facings of the mat disc, each facing of said disc being corrected by rendering portions of the frictional area thereof ineffective to substantially equalize the circumferential rubbing surface of each facing at all radial distances, the corrections on one facing being arranged to leave thereon a smaller total rubbing area than the total rubbing area of the other facing.

17. In a clutch mechanism, a mat disc, a facing on each side thereof, pressure members on opposite sides thereof adapted to frictionally engage the respective facings of the mat disc, the effective rubbing area of one facing being smaller than the rubbing area of the other facing.

18. In a clutch mechanism a friction disc, a pressure element on each side to frictionally engage and drive the disc, one of the pressure elements being constructed to be heated by the friction in a shorter period than the other; and means to render the frictional heat on one side of the disc equal with the frictional heat on the other side thereof.

In testimony whereof, I have hereunto set my hand at Detroit, Michigan, this 3rd day of April, 1930.

GEORGE S. LANE.